United States Patent
Rick et al.

(10) Patent No.: US 8,262,127 B2
(45) Date of Patent: Sep. 11, 2012

(54) OCCUPANT PROTECTION DEVICE FOR A VEHICLE

(75) Inventors: Ulrich Rick, Braunweiler (DE); Thomas Jenny, Alsbach-Haehnlein (DE)

(73) Assignee: GM Global Technology Operations LLC, Detroit, MI (US)

( * ) Notice: Subject to any disclaimer, the term of this patent is extended or adjusted under 35 U.S.C. 154(b) by 45 days.

(21) Appl. No.: 12/882,396

(22) Filed: Sep. 15, 2010

(65) Prior Publication Data

US 2011/0109066 A1 May 12, 2011

(30) Foreign Application Priority Data

Sep. 16, 2009 (DE) .......................... 10 2009 041 709

(51) Int. Cl.
*B60R 21/215* (2011.01)
*B60R 21/203* (2006.01)
(52) U.S. Cl. ..................................... 280/728.3; 280/731
(58) Field of Classification Search ............... 280/728.2, 280/728.3, 731, 732
See application file for complete search history.

(56) References Cited

U.S. PATENT DOCUMENTS

| | | | | |
|---|---|---|---|---|
| 6,099,027 A * | 8/2000 | Shirk et al. | ................. | 280/728.3 |
| 6,106,920 A | 8/2000 | Pichon et al. | | |
| 6,136,415 A * | 10/2000 | Spengler | ...................... | 428/157 |
| 7,810,836 B2 * | 10/2010 | Muller et al. | .............. | 280/728.2 |
| 2003/0020263 A1 * | 1/2003 | Preisler | ...................... | 280/728.3 |
| 2004/0195814 A1 | 10/2004 | Muller et al. | | |
| 2006/0151919 A1 | 7/2006 | Renner et al. | | |
| 2006/0231536 A1 | 10/2006 | Griebel et al. | | |
| 2007/0040360 A1 * | 2/2007 | Riha et al. | .................. | 280/728.3 |
| 2009/0146402 A1 * | 6/2009 | Chen et al. | .................. | 280/728.3 |
| 2010/0295282 A1 | 11/2010 | Kim et al. | | |

FOREIGN PATENT DOCUMENTS

| | | | |
|---|---|---|---|
| DE | 4035822 | A1 | 5/1992 |
| DE | 69800347 | T2 | 2/2001 |
| DE | 10231131 | A1 | 2/2004 |
| DE | 10254377 | B3 | 3/2004 |
| DE | 10260988 | A1 | 7/2004 |
| DE | 102005004452 | A1 | 8/2006 |
| DE | 102006062642 | B3 | 8/2008 |
| DE | 102007013163 | A1 | 9/2008 |
| EP | 1380477 | A1 * | 1/2004 |
| JP | 8244553 | A | 9/1996 |

OTHER PUBLICATIONS

Translation of JP 8244553 A.*
Translation of DE102006062642 B3.*
British Search Report dated Dec. 21, 2010, issued in Application No. 1015188.4.
German Search Report dated Mar. 18, 2010, issued in Application No. 10 2009 041 709.5.

* cited by examiner

*Primary Examiner* — Joseph Rocca
(74) *Attorney, Agent, or Firm* — Ingrassia Fisher & Lorenz, P.C.

(57) ABSTRACT

An occupant protection device is provided for a vehicle, with at least one airbag module, which is entirely or partially covered by a fiber material, wherein the airbag module includes, but is not limited to at least one opening line. The at least one opening line is suitable for and/or designed for providing an opening function. The at least one opening line is covered with a tear-open region of the fiber material. The tear-open region in transverse extension over the opening line is designed homogenously.

25 Claims, 3 Drawing Sheets

OCCUPANT PROTECTION DEVICE FOR A VEHICLE

CROSS-REFERENCE TO RELATED APPLICATION

This application claims priority to German Patent Application No. 102009041709.5, filed Sep. 16, 2009, which is incorporated herein by reference in its entirety.

TECHNICAL FIELD

The invention relates to an occupant protection device for a vehicle with at least one airbag module which is entirely or partially covered by a fiber material wherein the airbag module comprises an opening line that is suitable for and/or designed for providing an opening function, and wherein the opening line is covered with a tear-open region of the fiber material.

BACKGROUND

Occupant protection devices are usually installed in vehicles in order to reduce and/or eliminate a risk of injury to one or a plurality of occupants in the event of a collision. Usually occupant protection devices comprise one or a plurality of airbag modules comprising at least one opening region, at least one gas generator and at least one airbag. The at least one airbag is designed to be filled and inflated with gas from the at least one gas generator in the event of a collision. The airbag module is designed to open in the at least one opening region in the event of a collision in order to ensure an emergence of the inflating airbag in the direction of the occupant(s).

The publication DE 102 60 988 A1 discloses a method for the treatment of fabrics and their use in decoration parts of vehicles, more preferably motor vehicles. Through treatment with a laser partial removal of a textile material is brought about in order to create a weakened zone in a flat textile structure. This weakened zone is required for an emergence of an airbag.

The publication DE 102 31 131 A1, which most probably forms the closest state of the art, describes an airbag cover and a method for producing an airbag cover with a first layer, which in the region of a tearing seam for unfolding an airbag is substantially intact and at least a second layer which for reinforcing the first layer is attached to the back of the latter, wherein merely the second layer has a weakened region in order to predetermine the course of the tearing seam during the unfolding of the airbag. Thus a seam that is invisible from the outside is created on the airbag cover.

The invention is based on at least one object of providing an occupant protection device that combines design and functional features. In addition, other objects, desirable features, and characteristics will become apparent from the subsequent summary and detailed description, and the appended claims, taken in conjunction with the accompanying drawings and this background.

SUMMARY

According to an embodiment of the invention, an occupant protection device with at least one airbag module is proposed. The occupant protection device is suitable for and/or designed for being integrated in a vehicle, more preferably in a motor car. The at least one airbag module is preferentially arranged in a steering wheel, more preferably in a hub region of the steering wheel. In a preferred design the at least one airbag module is designed as a driver airbag and/or front-end airbag.

The at least one airbag module is entirely or partially covered with a fiber material. In particular it is possible that the airbag comprises uncovered part areas which alternate with covered part areas and/or adjoin these. Optionally, the fiber material covers the airbag module throughout and/or without interruptions. It is also conceivable that the fiber material covers the airbag module over the full area with interruptions. For example, the fiber material can cover the airbag module over the full area in a grid-like manner. Preferentially the fiber material covers the airbag module in a regular and/or irregular pattern. Combinations of the aforementioned possibilities are likewise conceivable. Preferentially the fiber material forms a flexible structure, wherein the fiber material has a substantially smaller thickness compared to its length. The fiber material has fibers which are more preferably arranged in a larger compound.

The airbag module comprises at least one opening line which forms an opening region. Optionally at least one gas generator and at least one airbag are provided. The airbag is suitable for and/or designed for being filled with gas from the gas generator upon activation, e.g., through a collision. The opening region is suitable for and/or designed for providing an opening function. Preferentially the opening region opens in that for example intended part regions of the airbag module fold open and/or fold over or tear open. In particular the opening region of the airbag module is suitable for and/or designed for enabling the airbag to unfold through the opening region in the direction of an occupant, particularly the vehicle driver. The opening line of the opening region can follow a straight, curved and/or circular course and/or another suitable course.

The opening line is covered with a tear-open region of the fiber material. The tear-open region is thus a flat component of the fiber material which in sections covers the opening region and part areas of the airbag module adjoining this. Preferentially the tear-open region covers the part areas of the airbag module which are arranged from the opening line in a radius of up to 4 cm, preferentially of up to 2 cm, more preferably of up to 1 cm. It is also possible that the tear-open region forms an area whose lateral boundaries on both sides are arranged spaced up to 4 cm, preferentially up to 2 cm, more preferably up to 1 cm along the opening line.

According to an embodiment of the invention, the tear-open region in transverse extension over the opening line is designed homogenously. In particular, the tear-open region extends perpendicularly and/or along the course and/or parallel to the course of the opening line, wherein the tear-open region at the transition over the opening line is designed homogenously. Preferentially the tear-open region does not comprise any additional weakening and/or perforation and/or predetermined breaking point(s). In particular, the tear-open region has the same thickness and/or strength over its entire area and/or expansion. The tear-open region preferentially extends over 50%, more preferably over 80% of the opening line. Particularly preferably, the tear-open region is designed homogeneously over its entire depth extension, i.e. over all intermediate layers as far as to the airbag module, particularly as far as to a dimensionally stable carrier region of the airbag module at the transition over the weakened line.

As disclosed in the publications DE 102 60 988 A1 and DE 102 31 131 A1, textile layers and/or flat fabrics which are designed for attachment to an airbag module, usually comprise tear-open regions with weakened zones, which for example are introduced through mechanical treatment. Cost advantages in the manufacture can thus be generated. As a further advantage it must be mentioned that the fiber material covering the airbag module and the opening region does not have any visible opening and/or tear-open region and because of this can be integrated in a vehicle interior in a design-oriented manner, more preferably in the steering wheel. Thus the invention advantageously provides functional and design elements.

Optionally, the opening line is designed as a weakening in the airbag module and/or as a tear-open seam and/or as a predetermined breaking point. Particularly preferably, the weakening is arranged on a carrier of the fiber material, specifically on a side facing away from the fiber material. With this further development, neither a weakening of the fiber material nor a weakening of the carrier is visible or tangible on the visible side of the airbag module.

In an embodiment of the invention the fiber material comprises fibers with an average length of up to 10 mm, preferentially of up to 6 mm, more preferably of up to 2 mm, especially of up to 0.3 mm. This design makes it possible that the fiber material shows a low tear strength and can thus be torn open without weakening in the region of the opening line.

Preferentially the fiber material comprises natural and/or plant fibers and/or fibers of animal origin. Optionally the fiber material comprises manmade and/or chemical fibers. More preferably the fiber material comprises polyester, polyamide, cotton and/or viscose fibers.

In a further embodiment, the fiber material is suitable for and/or designed for forming a flat structure. In particular, the flat structure is not a woven design. More preferably the flat structure is not a woven fabric and/or knitted fabric. Advantageous in such non-woven and/or non-knitted flat structures is that these are suitable for and/or designed for tearing without prior and/or additional weakening, more preferably in the tear-open region, upon activation of the airbag module.

In an alternate embodiment of the invention, the fiber material comprises fleece material. It is possible that the fleece material is of isotropic design, wherein the fibers of the fiber material have no preferential direction in their alignment and/or orientation. It is also conceivable that the fleece material is of anisotropic design, wherein the fibers of the fiber material have a preferential direction and/or are more frequently arranged in one direction than in the other direction.

A further possible embodiment of the invention provides that the fiber material comprises felt. Preferentially the felt fibers are arranged irregularly and/or tangled, more preferably the felt fibers are designed in such a manner that these are intertwined. It is conceivable that the fiber material comprises needled felt, fulled felt or pressed felt.

Optionally the fiber material comprises flock. Preferentially the flock comprises flock fibers having a thickness of up to 25 dtex, preferentially of up to 15 dtex, more preferably of up to 1 dtex. More preferably the flock has a continuous cut length of up to 2.5 mm, preferentially of up to 1 mm, more preferably of up to 0.3 mm.

In a further possible design the fiber material is directly and/or indirectly applied to the airbag module with one or a plurality of intermediate layers. Optionally an adhesive bed covers the airbag module entirely or partially. On the adhesive bed, the fiber material, more preferably the flock fibers are preferentially arranged.

In a further embodiment, the fiber material comprises a protective layer. Preferentially the protective layer is arranged on a top side of the fiber material, wherein the top side faces a vehicle interior. In a possible design the protective layer can ensure protection from dirt accumulation, wear, fading and/or yellowing. More preferably the protective layer is formed through an impregnation and/or a Teflon, nano, top tec and/or paint coating. The protective layer can be sprayed on, brushed on, coated on or applied to the fiber material by any other suitable method. Advantageously, the protective layer thus offers longevity with lasting attractive appearance.

A further embodiment of the invention provides that the airbag module comprises an airbag module cover which is releasably arranged on the airbag module. Preferentially the airbag module cover comprises the opening region or the opening region is arranged in the region of the airbag module cover. More preferably the airbag module cover is designed to be removed from the airbag module without damage. The airbag module cover can be hooked in, engaged in, screwed to the airbag module or be releasably tied to the airbag module using other suitable fastening means.

An advantage of the releasable arrangement is that replacement of the airbag module cover can be performed without problem. This can be particularly beneficial in the event of damage to the airbag module cover and/or the fiber material of the airbag module cover. It is also particularly advantageous that it allows a customer to follow design trends and satisfy his own taste in that he can decide on another fiber material and/or a differently designed fiber material of the airbag module cover even after a purchase of a vehicle. Thus individual, changing customer wishes can also be satisfied in "after sales business".

Optionally, only the airbag module cover can be entirely or partially covered by the fiber material. It is particularly preferred that the airbag module cover in its thickness is reduced by a height of the fiber material. Thus smooth transitions on the airbag module or other components adjoining the airbag module cover can be ensured.

It is also conceivable that the airbag module and the airbag module cover are entirely or partially covered by the fiber material. In this case it is particularly preferred that the airbag module cover and/or the airbag module in their thickness is/are reduced by a height of the fiber material. Because of this, smooth transitions between the airbag module and the airbag module cover and/or other components adjoining the airbag module and/or the airbag module cover can be achieved. More preferably, smooth transitions between the airbag module and/or the airbag module cover and adjoining interior elements such as for instance steering wheel emblems, steering wheel spokes and/or a steering wheel rim can be made possible.

A further embodiment of the invention provides that the flat structure in a transition region between the airbag module cover and one or a plurality of components adjoining the airbag module cover comprises cut and/or joint locations. For example the cut or joint locations are arranged between the airbag module cover and the airbag module. Here, the flat structure substantially spans only the airbag module cover and adjoins the airbag module.

In a further embodiment of the invention the flat structure comprises a detachment protection on the cut and/or joint locations. Preferentially the detachment protection comprises a constructive design that is suitable to avoid laying-open and/or standing proud of the cut and/or joint locations of the flat structure from the airbag module cover and/or the airbag module. The cut and/or joint locations are for example bordered by an extension on the airbag module and/or the airbag module cover and/or integrated in a bead and/or groove and/or depression of the airbag module and/or the airbag module cover. Optionally the flat structure can be wrapped and/or folded about the airbag module cover or the airbag module. The detachment protection advantageously provides an increase of the longevity and/or durability of the flat structure. Thus a quality increase can be achieved and complaints avoided.

In a further embodiment of the invention the airbag module comprises a grounded metal component, wherein between the component and the fiber material there is an electrically conductive connection. Preferentially the connection is effected via electrically conductive filaments, cables or ribbons, which optionally tear on activation of the airbag module. It is also conceivable that the fiber material and/or the airbag module cover and/or the airbag module comprise/s electrically conductive components such as for instance fibers, particularly carbon fibers. These can for example be introduced in and/or woven in and/or sewn into the fiber material. In the airbag module cover and/or the airbag module, these can be injection-molded in. It is likewise optionally possible that the intermediate layer/s of the fiber material and/or the protective layer is/are designed in an electrically conductive manner. Combinations of the mentioned possibilities are likewise conceivable. It is advantageous that electrostatic charging of the fiber material, which can develop for instance through friction, is averted in that the charge can be safely and evenly discharged.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
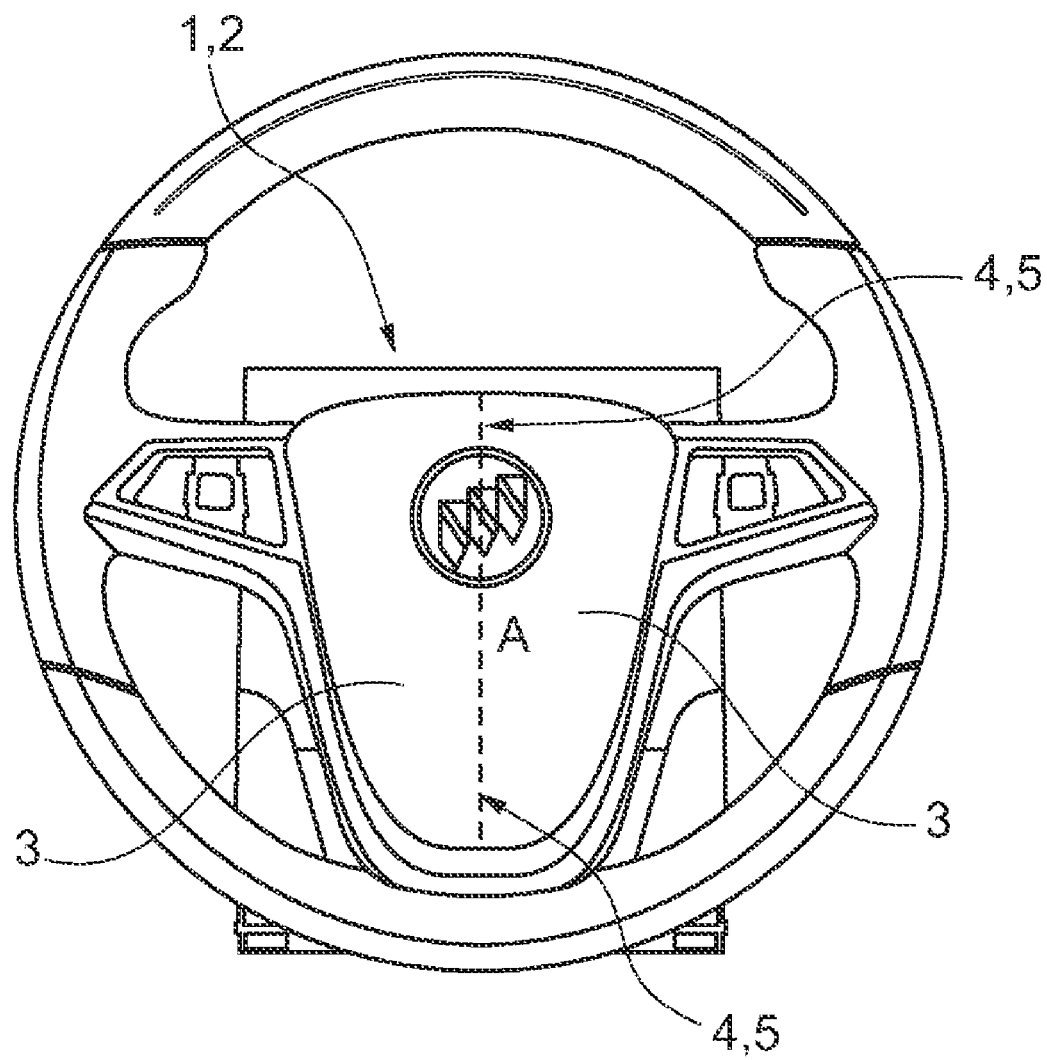
FIG. 1 a top view of a steering wheel with an occupant protection device.

A preferred exemplary embodiment of the invention is shown in FIG. 1. A top view of a steering wheel with an occupant protection device 1 is shown. The occupant protection device 1 is suitable for and/or designed for being integrated in a vehicle, more preferably in a motor car. It comprises an airbag module 2 which is arranged in a hub region of the steering wheel. The airbag module 2 comprises at least one gas generator and at least one airbag. In the event of an accident, particularly in the event of a front-end collision, gas flows out of the at least one gas generator into the at least one airbag. The at least one airbag is designed to inflate in the direction of a vehicle driver, cushion an impact of the vehicle driver and protect said driver from injuries.

The airbag module 2 is entirely covered with a fiber material 3 and comprises an opening region 4. The opening region 4 is suitable for and/or designed for providing an opening function. Preferentially the airbag module 2 opens in the opening region 4 during the accident in that parts of the airbag module 2 fold down and/or fold over or detach from the airbag module 2. In particular, the opening region 4 in the accident allows the emergence of the inflating at least one airbag from the airbag module 2. The opening region 4 is linearly opened along an opening line A. The opening line A is interrupted by a round emblem which is arranged in the middle of the airbag module. The opening line A divides the airbag module 2 in two halves, which then fold away laterally and expose the opening region 4.

The fiber material 3 comprises a tear-open region 5 which covers the opening line A so that the opening line A is arranged not visible to the vehicle driver. The tear-open region 5 forms an area whose lateral boundaries on both sides are arranged spaced from the opening line A by up to 4 cm, preferentially by up to 2 cm, more preferably by up to 1 cm. Preferentially the lateral boundaries follow a course parallel to the opening line A. The tear-open region 5 is of a continuously homogenous design, preferentially it has the same thickness and/or strength over its entire extension and/or area. In particular, it has no weakened areas and/or tearing seams introduced in the fiber material 3.

The tear-open region 5 is suitable for and/or designed for tearing upon activation of the airbag module 2 and/or upon opening of the opening line A. In particular, the tear-open region 5 ensures complete unobstructed emergence of the inflating at least one airbag from the airbag module 2.

The fiber material 3 comprises fibers with a length of up to 2 mm and a thickness of up to 22 dtex. It comprises flock fibers of natural origin and/or artificial fibers. More preferably the flock fibers are produced from cotton, polyamide and/or viscose.

The fiber material 3 is indirectly applied to the airbag module 2 with an intermediate layer. Preferentially the intermediate layer is designed as an adhesive bed. Applying the adhesive bed is effected for example through a screen printing method, through spraying on with a spray gun or an immersion bath.

The fiber material 3 is arranged on and/or glued to the adhesive bed. In particular, the flock fibers are suitable for and/or designed for being electrostatically applied to the adhesive bed.

On the visual side the fiber material 3 comprises an optional protective layer which protects the fiber material 3 from damage, dirt accumulation, yellowing or fading. The protective layer can be an impregnation and/or sealing of the fiber material, with which preferentially a top-tec, nano, Teflon, and/or a paint coating can be employed. More preferably, the protective layer is applied to the fiber material 3. Application is for example performed by spraying on the protective layer to a top side of the fiber material 3, wherein the topside faces the vehicle driver.

The airbag module 2 optionally comprises a grounded metal component, wherein between the component and the fiber material 3 there is an electrically conductive connection. In particular, the intermediate layer and/or the protective layer of the fiber material 3 is of an electrically conductive design. Thus an electrostatic charge of the fiber material 3, which is caused for example through friction, can be safely and evenly discharged.

Figure 2:
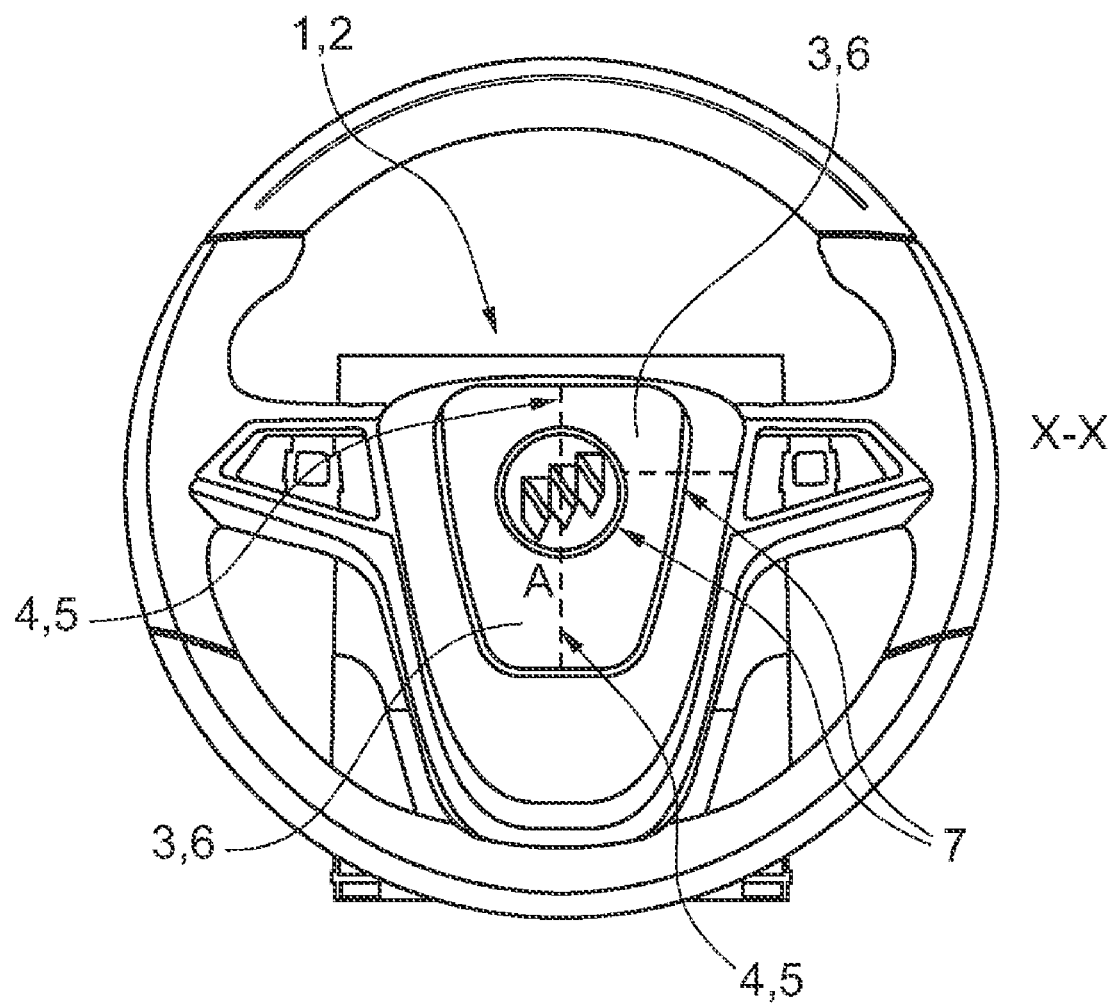
FIG. 2 a top view of a steering wheel with a variation of the occupant protection device from FIG. 1.

FIG. 2 shows a top view of a steering wheel with a variation of the occupant protection device 1 from FIG. 1. Corresponding or same parts in the Figures are always provided with the same reference characters.

The airbag module 2 comprises an airbag module cover 6, wherein the fiber material 3 is only attached to the airbag module cover 6. The opening line A of the airbag module 2 and the tear-open region 5 of the fiber material 3 is restricted to the airbag module cover 6.

The airbag module cover 6 comprises for example electrically conductive components such as for instance carbon fibers which are introduced in the material of the airbag module cover 6, more preferably injection-molded in. The electrically conductive components however can also be introduced and/or woven in and/or sewn into the fiber material 3. Between the fiber material 3 and the components there is a conductive connection which can discharge a possible charge of the fiber material 3, for instance caused through friction.

The fiber material 3 comprises animal fibers, e.g. silk and/or wool, plant fibers such as cotton and/or chemical fibers such as polyester. The fibers have a length of up to 10 mm, preferentially of up to 6 mm, more preferably of up to 2 mm.

The fiber material 3 forms a flat structure which is more preferably a non-woven design. Preferentially the fiber material is not a woven and/or knitted fabric. More preferably, the fiber material 3 is designed as a fleece material or as felt.

In a transition region between the airbag module 2 and the airbag module cover and between the airbag module cover 6 and the round emblem the flat structure comprises cut and/or joint locations 7.

Figure 3:
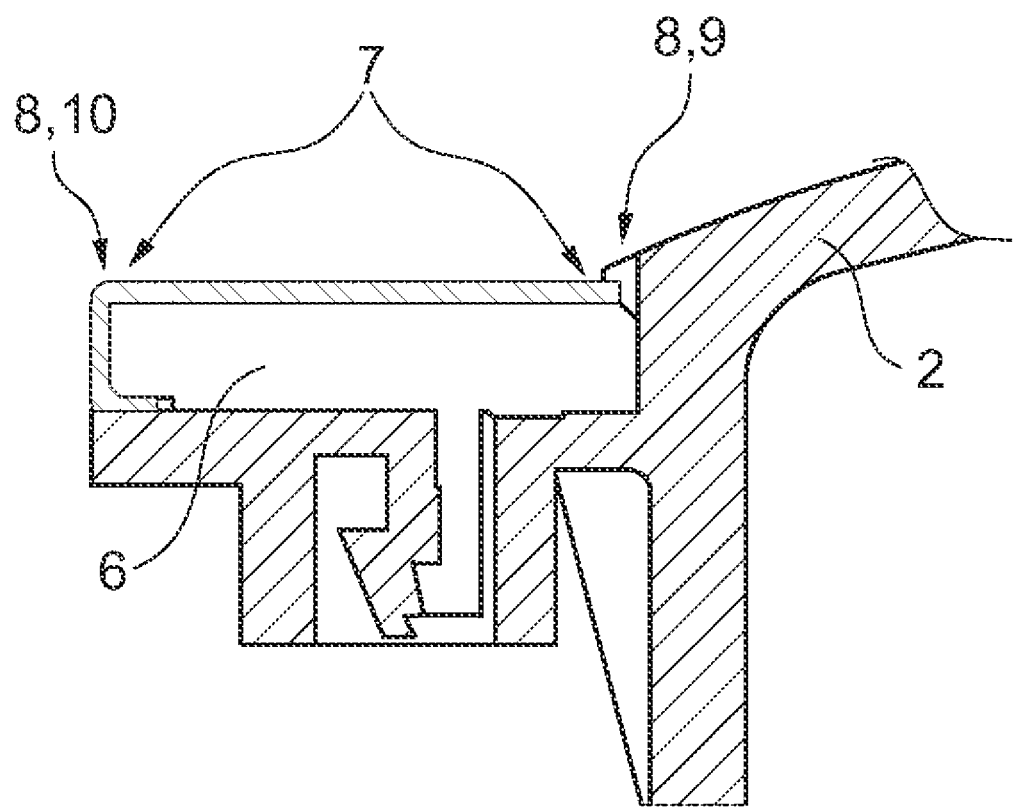
FIG. 3 a section through the occupant protection device from FIG. 2.

FIG. 3 shows a sectional representation through the airbag module 2 from FIG. 2, wherein corresponding or same parts are provided with the same reference characters. Section X-X shows the transition region between the airbag module 2 and the airbag module cover 6. The airbag module cover 6 is releasably arranged on the airbag module 2 in that the airbag module cover 6 is hooked into the airbag module 2 or engaged in the airbag module 2. In particular, the airbag module cover 6 can be removed for instance for repair or replacement purposes without damage and reinstalled and/or replaced with another airbag module cover 6 covered with a different fiber material 3 if required.

The flat structure comprises a detachment protection 8 on the cut and/or joint locations 7. The detachment protection 8 is designed on a first end 9 of the flat structure as an extension of the airbag module 2 which extends over the first end 9. On a second end 10, which is arranged on the transition region between the airbag module cover 6 and the round emblem, the detachment protection 8 is designed as a wrap-over of the flat structure about the airbag module cover 6. Alternatively, the detachment protection 8 can also be designed as a border of the flat structure, e.g. through backmolding and/or as a bead and/or groove on the airbag module 2 and/or the airbag module cover 6 and/or the round emblem, into which the flat structure protrudes on one or both ends 9; 10.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An occupant protection device for a vehicle, comprising:
   an airbag module that is at least partially covered by a fiber material;
   an opening line of the airbag module that is adapted to provide an opening function; and
   a tear-open region of the fiber material that covers the opening line, the tear-open region in transverse extension is homogenously designed over the opening line,
   wherein the fiber material is suitable for forming a flat structure, and
   wherein the flat structure in a transition region between an airbag module cover and at least one component adjoining the airbag module cover comprises a cut location or a joint location.

2. The occupant protection device according to claim 1, wherein the airbag module is arranged in a hub region of a steering wheel.

3. The occupant protection device according to claim 1, the airbag module comprises a weakened region that runs along the opening line and is arranged on a side of a carrier for the fiber material facing away from the fiber material.

4. The occupant protection device according to claim 1, wherein the fiber material comprises fibers with an average length of up to approximately 10 mm.

5. The occupant protection device according to claim 1, wherein the fiber material comprises fibers with an average length of up to approximately 6 mm.

6. The occupant protection device according to claim 1, wherein the fiber material comprises fibers with an average length of up to approximately 2 mm.

7. The occupant protection device according to claim 1, wherein the fiber material comprises fibers with an average length of up to approximately 0.3 mm.

8. The occupant protection device according to claim 1, wherein the fiber material comprises natural fibers.

9. The occupant protection device according to claim 1, wherein the fiber material comprises plant fibers.

10. The occupant protection device according to claim 1, wherein the fiber material comprises fibers of animal origin.

11. The occupant protection device according to claim 1, wherein the fiber material comprises material of artificial origin.

12. The occupant protection device according to claim 1, wherein the fiber material comprises polyester fibers.

13. The occupant protection device according to claim 1, wherein the fiber material comprises polyamide fibers.

14. The occupant protection device according to claim 1, wherein the fiber material comprises cotton fibers.

15. The occupant protection device according to claim 1, wherein the fiber material comprises viscose fibers.

16. The occupant protection device according to claim 1, wherein the fiber material comprises fleece material.

17. The occupant protection device according to claim 1, wherein the fiber material comprises a felt.

18. The occupant protection device according to claim 1, wherein the fiber material comprises a flock.

19. The occupant protection device according to claim 1, wherein the fiber material comprises a protective layer.

20. The occupant protection device according to claim 1, wherein the airbag module comprises an airbag module cover that is releasably arranged on the airbag module.

21. The occupant protection device according to claim 1, wherein the flat structure in a transition region between an airbag module cover and at least one component adjoining the airbag module cover comprises the cut location.

22. The occupant protection device according to claim 1, wherein the flat structure in a transition region between an airbag module cover and at least one component adjoining the airbag module cover comprises the joint location.

23. The occupant protection device according to claim 21, wherein the flat structure on the cut location comprises a detachment protection.

24. The occupant protection device according to claim 22, wherein the flat structure on the joint location comprises a detachment protection.

25. The occupant protection device according to claim 1, wherein the airbag module comprises a grounded metal component, wherein between the grounded metal component and the fiber material there is an electrically conductive connection.

* * * * *